United States Patent [19]

Pike et al.

[11] Patent Number: 4,847,106
[45] Date of Patent: Jul. 11, 1989

[54] METHOD OF PRESSING SESAME SEEDS

[75] Inventors: Wilson C. Pike, Halesite; William S. Robertson, Huntington, both of N.Y.

[73] Assignee: RME Research Associates, New York, N.Y.

[21] Appl. No.: 191,765

[22] Filed: May 3, 1988

Related U.S. Application Data

[63] Continuation of Ser. No. 781,761, Sep. 30, 1985, abandoned.

[51] Int. Cl.[4] .............................................. A23L 1/20
[52] U.S. Cl. .................................... 426/629; 426/417; 426/469; 426/489
[58] Field of Search ............... 426/629, 489, 622, 601, 426/417, 443, 467, 468, 469, 481, 478, 482, 484, 518

[56] References Cited

U.S. PATENT DOCUMENTS

| 1,470,929 | 10/1923 | Chen Lai | 426/578 |
|---|---|---|---|
| 2,280,046 | 6/1939 | Musher | 426/417 |
| 4,009,290 | 2/1977 | Okumou et al. | 426/489 |
| 4,543,264 | 9/1985 | Stahel | 426/629 |

OTHER PUBLICATIONS

"Sesame Protein Review and Prospectus"; Johnson, Suleiman, & Lucas, Journal of the American Oil Chemists Society, Mar., 1979, vol. 56, pp. 463–468.
Surendronath et al., 1982, The Oils and Oilseeds Journal, Oct.–Dec. issue, pp. 43–48.
Ramachandra et al., 1970, J. of Food Science and Technology, 7:127.
Sastry 1969, J. Am. Oil Chem. Soc. 46:592A, 594A and 596A.
D. Swern 1964 Baileys Industrial Oil & Fat Products Interscience Publishers N.Y., 3rd edition, pp. 637–651.
Altschul 1958 Processed Plant Protein Food Stuffs, Academic Press Inc., publisher N.Y., pp. 70–77.
"Effect of Processing on the Composition of Sesame Seed and Meal"; Carter, Cirino & Allen, Journal of the American Oil Chemists Society, Mar., 1961, vol. 38, pp. 148–150.
"Effect of Dehulling and Heat Processing on Nutritional Value of Sesame Proteins"; Sastry, Subramanian, & Parpia, Journal of the American Oil Chemists Society, Apr., 1974, vol. 51, pp. 115–118.
"Sesame: Current Knowledge of Composition and Use"; C. K. Lyon, Journal of the American Oil Chemists Society, Apr., 1972, vol. 49, p. 245.
Sastry 1969, J. Am. Oil Chem. Soc. 46:592A, 594A and 596A.

Primary Examiner—Donald E. Czaja
Assistant Examiner—Carolyn Paden
Attorney, Agent, or Firm—Felfe & Lynch

[57] ABSTRACT

A method of pressing sesame seeds to provide sesame flour having an oil content not greater than 45% by weight and sesame oil having a substantially 100% purity, and the sesame flour made by the method, and the sesame oil made by the method. The method comprises feeding dehulled sesame seeds into an expeller press having a choke opening for expelling sesame flour having an oil content not greater than 45% by weight in a single pressing, and maintaining a temperature not greater than 180° F. in the sesame food material being pressed, and extracting sesame oil at a rate of at least two-thirds by weight of the flour from the dehulled sesame seeds during the single pressing.

5 Claims, 1 Drawing Sheet

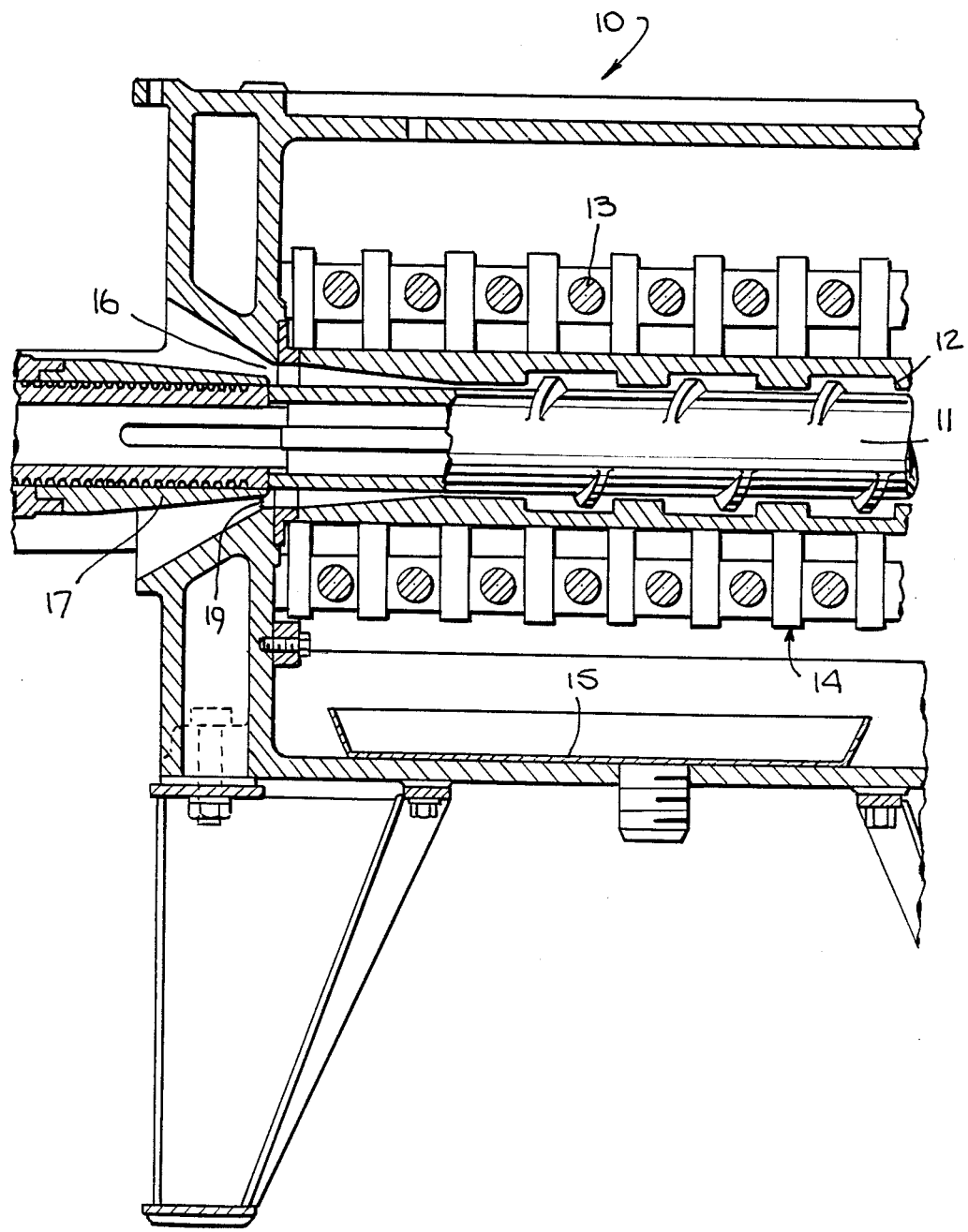

METHOD OF PRESSING SESAME SEEDS

This application is a continuation of application Ser. No. 781,761 filed Sept. 30, 1985.

This invention relates to a method of pressing dehulled sesame seeds and, more particularly, to such a method which is capable of commercially producing uncontaminated sesame seed flour and uncontaminated sesame seed oil.

Heretofore, some prior commercial methods of pressing sesame seeds to produce sesame oil involved pressing the entire sesame seed including its hull with the result that the oil contained an undesirably high percentage of contamination from surface filth from the hull (e.g., excreta, pesticide, chemicals, dirt, aflo toxin) or calcium oxalate which is contained in the hull. Oil from such a procedure requires refining.

Sesame seeds which are dehulled have ordinarily been dehulled by chemical methods which result in contamination of the dehulled sesame seeds and can shorten shelf life of sesame oil and flour. Where sesame seeds are primarily processed for oil content, the seeds are not dehulled, rather the entire seed is crushed. As a result the oil contains oxalic acid which is associated with the outer epidermal layer, and a higher pesticides level and contaminants from the hull surface as mentioned above, and the protein content of the meal is reduced since the hull is primarily composed of fiber, and the enzymatic digestibility is limited.

When it has been attempted to press chemically dehulled seed, the seed had been hulled with lye or caustic soda, a known contaminant of sesame.

It is an object of the present invention, therefore, to provide a new and improved method of pressing sesame seeds which avoids one or more of the disadvantages and limitations of prior such methods.

It is another object of the invention to provide a new and improved method of pressing sesame seeds for simultaneously providing products of both oil and flour.

It is another object of the invention to provide a new and improved method of pressing sesame seeds which provides products of oil and flour of substantially superior quality.

It is another object of the invention to provide a new and improved method of pressing dehulled sesame seeds which is commercially practical.

It is another object of the invention to provide a new and improved method of pressing dehulled sesame seeds for providing a sesame flour having an oil content not greater than 45% by weight for stability and food usage.

It is another object of the invention to provide a new and improved method of pressing dehulled sesame seeds for providing sesame oil having substantially superior quality.

It is another object of the invention to provide a new and improved method of pressing sesame seeds for providing sesame oil which obviates a step of refining the oil which is essential in obtaining other sesame oils.

It is another object of the invention to provide a new and improved method of pressing sesame seeds for providing sesame oil which does not require cooking of the sesame seeds at 200° F. before the pressing.

It is another object of the invention to provide sesame flour which requires no further screening or drying after being extracted from the press and which can be packaged immediately to preserve shelf life.

In accordance with the invention, a method of pressing sesame seeds comprising feeding dehulled sesame seeds into an expeller press having a choke opening for expelling sesame flour having an oil content not greater than 45% by weight in a single pressing. The method includes maintaining a temperature not greater than 180° F. in the sesame food material being pressed and extracting sesame oil at a rate of at least two-thirds by weight of the flour from the dehulled sesame seeds during a single pressing.

For a better understanding of the present invention, together with other and further objects thereof, reference is made to the following description, taken in connection with the accompanying drawings, and its scope will be pointed out in the appended claims.

Referring now to the drawings, the figure is a fragmentary schematic, sectional view of a commercially available expeller press suitable for practicing the invention.

In practicing the invention, a non-chemically treated dehulled sesame seed is utilized such as that which is commercially available from International Protein Industries, Inc., Smithtown, New York as Protein-Aide Sesame Seed. Protein-Aide is a registered trademark of International Protein Industries, Inc. This sesame seed is free of chemical contamination within the meaning of this specification and the claims, although insubstantial trace amounts of sulfur (e.g. 3.8 parts per million) or other undesirable chemicals may be present.

The expeller press of FIG. 1 is commercially available from Anderson International Corp. of Cleveland, Ohio and is known as Red Lion Expeller, type 6498.4. The press 10 comprises a feed screw (not shown) for feeding sesame seeds to a main worm shaft 11 enclosed in a barrel 12 supported by a cage unit 13, 14. The barrel 12 has slits (not shown) for the flow of sesame seed oil into a drip tray 15. The press has an adjustable choke opening 16 which has a width that may be adjusted by movement of cone 17 into and out of the aperture for the passage of flour therethrough. Heretofore, it has been thought that in commercial oil seed pressing, including sesame seed, that high heat is essential to maximize yield. However, we have found that feeding dehulled sesame seeds into an expeller press having a choke preferably having an annular opening having an open width dimension 19 in the range of ⅛ inch to ¼ inch and maintaining the temperature of the press not greater than 180° F. in the sesame food material being pressed, preferably by hot water at approximately 175° F., and preferably with a feed rate of approximately 250–500 lbs of seed per hour, and more preferably with a feed rate of approximately 350 lbs. of the seed per hour, provides a superior product. There is a low oil content in the flour for stability and food usage and also there is a large proportionate yield of oil. At optimum levels the press yields 12 oz. of oil and 10 oz. of flour per fifteen seconds. If desired, before pressing the seed may be heated to 160° F. to bring the seed up in temperature and reduce water moisture.

Low temperature pressing at below 180° F. is believed to protect the natural composition of the oil for better stability and better aroma and flavor. The dehulled seed does not damage the press and prolongs its life and reduces maintenance. The sesame seed is dried to below 3% water moisture in the flour. Thus, it is not necessary to dry the flour after it is expelled from the press since there is low bacteria growth and the flour is ready to package immediately.

The sesame flour made by this method has an oil content not greater than 45% by weight and preferably not greater than 40% by weight and more preferably in the 30% to 35% range. The protein efficiency ratio of the flour is greater than that of flour made by pressing entire sesame seeds including the hulls. The sesame oil made by the method of the present invention has a substantially 100% purity. Since the oil has no contaminants from the shell and suffers no destruction from high temperature, the oil does not require refining. A typical level of free fatty acids in the oil is 0.7% by weight, which is low for better stability and better aroma and flavor.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed:

1. A method of pressing seeds to produce oil and flour comprising:

feeding dehulled sesame seeds free of calcium oxalate, oxalic acid, chemical, excretory and other contaminants into a screw press having a choke opening, while maintaining a temperature not greater than 180° F. in the sesame food material being pressed, such that the press expels sesame flour having an oil content not greater than 45% by weight of oil in the flour in a single pressing of the seeds by the press, whereby sesame oil is extracted at a substantial rate with respect to the total yield of oil and flour extracted from the dehulled sesame seeds during the single pressing.

2. A method in accordance with claim 1, which includes the step of pre-heating the seeds to approximately 160° F.

3. A method in accordance with claim 1, in which the step of maintaining the temperature of the food material being pressed comprises maintaining the temperature at approximately 175° F.

4. A method in accordance with claim 1, in which the rate of feeding the seeds is approximately 350 pounds per hour.

5. A method in accordance with claim 1, in which the sesame seed is dried, the water moisture content being less than 3% in the flour.

* * * * *